(12) United States Patent
Wojcik et al.

(10) Patent No.: US 10,887,534 B2
(45) Date of Patent: Jan. 5, 2021

(54) HIGH FRAME CAPTURE RATE SYNCHRONIZATION WITH STREAMING MODE

(71) Applicant: CARESTREAM HEALTH, INC., Rochester, NY (US)

(72) Inventors: Timothy J. Wojcik, Rochester, NY (US); Eric M. Welch, Avon, NY (US); Samuel Richard, Rochester, NY (US); Gordon Geisbuesch, Fairport, NY (US); Mark E. Shafer, Fairport, NY (US); Scott A. Rogerson, Rochester, NY (US)

(73) Assignee: Carestream Health, Inc., Rochester, NY (US)

(*) Notice: Subject to any disclaimer, the term of this patent is extended or adjusted under 35 U.S.C. 154(b) by 0 days.

(21) Appl. No.: 16/304,391

(22) PCT Filed: Jun. 8, 2017

(86) PCT No.: PCT/US2017/036475
§ 371 (c)(1),
(2) Date: Nov. 26, 2018

(87) PCT Pub. No.: WO2017/214350
PCT Pub. Date: Dec. 14, 2017

(65) Prior Publication Data
US 2019/0199944 A1 Jun. 27, 2019

Related U.S. Application Data

(60) Provisional application No. 62/347,634, filed on Jun. 9, 2016.

(51) Int. Cl.
*H04N 5/341* (2011.01)
*H04N 5/32* (2006.01)
(Continued)

(52) U.S. Cl.
CPC ............... *H04N 5/341* (2013.01); *H04N 5/32* (2013.01); *H04N 5/343* (2013.01); *H04N 5/378* (2013.01); *H04N 5/3765* (2013.01)

(58) Field of Classification Search
None
See application file for complete search history.

(56) References Cited

U.S. PATENT DOCUMENTS

2003/0223539 A1 12/2003 Granfors et al.
2006/0071171 A1* 4/2006 Kameshima ............ A61B 6/00
250/370.09
(Continued)

FOREIGN PATENT DOCUMENTS

EP 1 642 528 4/2006
JP 2009-037028 2/2009

OTHER PUBLICATIONS

International Search Report dated Sep. 4, 2017 for International Application No. PCT/US2017/036475, 2 pages.

*Primary Examiner* — Dave Czekaj
*Assistant Examiner* — Samuel D Fereja

(57) ABSTRACT

A digital radiographic detector detects a first mode signal and dispositions a received digital image according to a procedure associated with the first mode signal. A second mode signal results in dispositioning a second received digital image according to a second image disposition procedure. The detector determines the first mode or second mode based on the signal's pulse width, a number and timing of rising edges (peaks), a digital code, a voltage level, or a combination thereof.

20 Claims, 7 Drawing Sheets

(51) Int. Cl.
*H04N 5/376* (2011.01)
*H04N 5/343* (2011.01)
*H04N 5/378* (2011.01)

(56) References Cited

U.S. PATENT DOCUMENTS

2011/0108710 A1* 5/2011 Yonekawa ............. A61B 6/585
 250/214 C
2013/0182934 A1* 7/2013 Topfer .................... G06T 5/005
 382/132

* cited by examiner

HIGH FRAME CAPTURE RATE SYNCHRONIZATION WITH STREAMING MODE

CROSS REFERENCE TO RELATED APPLICATIONS

This application claims the benefit of and is a U.S. National Phase filing of PCT Application PCT/US2017/036475 filed Jun. 8, 2017 entitled "HIGH FRAME CAPTURE RATE SYNCHRONIZATION WITH STREAMING MODE", in the name of Wojcik et al., which claims benefit of U.S. Patent Application Ser. No. 62/347,634, filed Jun. 9, 2016, in the name of Wojcik et al., and entitled HIGH FRAME CAPTURE RATE SYNCHRONIZATION WITH STREAMING MODE, which is hereby incorporated by reference herein in its entirety.

This application is related in certain respects to U.S. patent application Ser. No. 14/534,737, filed Nov. 6, 2014, in the name of Topfer, et al., and entitled DIGITAL RADIOGRAPHY DETECTOR IMAGE READOUT which is incorporated herein by reference in its entirety.

BACKGROUND OF THE INVENTION

The subject matter disclosed herein relates to digital radiographic detectors. In particular, to transmission modes for delivering captured images at a high frame rate.

Several image capture modes need to be supported on digital radiographic detectors in which the desired frame rate is high and flexibility to activate different capture states is supported, especially with respect to user timing of study initiation and x-ray exposure cycles. The imaging applications may include tomosynthesis, fluoroscopy (including a "pause" mode during a capture series), and scout image captures for positioning verification prior to image series capture.

DR detectors have several inherent elements of non-uniform performance (e.g. pixel gain and offset variations) and defective pixels that may need to be concealed before presenting the image for display. These corrections may be conducted on board the detector using calibration results (gain maps, defective pixel maps, offset maps) acquired at the time of manufacturing or at intervals during use in the field at the customer site. Offset variations may be corrected by capturing non-exposed images immediately before or immediately after exposed frame captures. It may be desirable to capture the dark (offset) images as close as possible to the actual exposed frame captures since temperature variations of the device over time can result in significant changes in pixel offset uniformity.

The discussion above is merely provided for general background information and is not intended to be used as an aid in determining the scope of the claimed subject matter.

BRIEF DESCRIPTION OF THE INVENTION

A digital radiographic detector detects a first mode signal and dispositions a received digital image according to a procedure associated with the first mode signal. A second mode signal results in dispositioning a second received digital image according to a second image disposition procedure. The detector determines the first mode or second mode based on the signal's pulse width, a number and timing of rising edges (peaks), a digital code, a voltage level, or a combination thereof.

In one embodiment, a method of operating a digital detector in a radiographic imaging system includes transmitting a first mode signal to the digital detector wherein the first mode signal is characterized by a detectable first characteristic. The detector receives the first mode signal and determines that the first characteristic is associated with a first operating mode. The detector initiates the first operating mode in response. The detector may acquire or receive image data and process the image data according to the first operating mode.

In another embodiment, a method implemented by a digital radiographic detector includes detecting a first mode signal and determining a first characteristic of the first mode signal. The first characteristic of the first mode signal may be associated with a first image disposition procedure so that a received image is dispositioned according to the first image disposition procedure. One or more additional modes may be detected including determining characteristics of corresponding additional received signals. Receiving further images corresponding to the additional signals results in dispositioning the received images using modes corresponding to the signals.

In one embodiment, a method of operating a digital detector in a radiographic imaging system includes sending a pulse having a first width to the digital radiographic detector. The detector is programmed to recognize the first width as being associated with a first operation mode, whereby the detector initiates the first operation mode. Sending a pulse having a second width to the digital radiographic detector results in the detector recognizing the second width as being associated with a second operation mode, wherein the detector initiates the second operation mode in response. The operation mode controls a mode of processing a digital image captured and processed in the detector.

In one embodiment, a method of controlling a digital radiographic detector includes transmitting a synchronization signal over only one synchronization line to the detector. The synchronization signal indicates a transition between an image capture state and an image readout state of the detector. A physical characteristic of the synchronization signal is selectively modified and is detectable by the detector. The physical characteristic is configured to cause the detector to disposition a radiographic image in the detector according to one of at least two different image disposition procedures.

One additional image capture variation that may be commonly used in high frame rate applications is to window the detector's image area by addressing a limited portion of the sensor array. This mode of operation results in faster frame capture rates since only a portion of the array is read out.

In certain system embodiments the corrections may be conducted on the detector, while some or all of the corrections may also be conducted on the host computer that processes the images in preparation for storage, transmission, or display. When offset corrections are conducted on the detector, it may be important to know at the time of acquisition whether a particular image frame is to be:

1) Retained on the detector for use in offset correction of exposed images;
2) Corrected using the retained offset images and forwarded to the host computer;
3) Forwarded to the host computer without corrections; or
4) Discarded after capture.

It may be desirable to create a capture cycle that is optimized for image quality by providing pre-exposure offset (dark) image captures immediately before exposure captures rather than capturing the offset images and then having a variable wait period depending on patient readiness and capture system state. It may also be desirable to have a non-prescribed number of exposed images captured as determined during the diagnostic procedure. Further it may be desirable to conduct the offset corrections on the detector so that only the corrected exposure images need to be transmitted to the host computer.

An improved capture mode may be desired that includes the following characteristics:

1) Programmable "warm-up" time for detector stabilization. The detector may require a warm-up time to achieve a state delivering consistent image quality at high signal gain and high frame rate. This can be achieved by continuously capturing and discarding images on the detector under program control to emulate the normal capture cycle.

2) Support of unlimited pre-exposure hold time in which a programmable minimum pre-exposure offset image set can be acquired and continuously updated while waiting to initiate the exposure cycle. This may be used to provide a weighted average correction frame in one embodiment or, in another embodiment, a weighted sum integrated correction frame. It may be also desirable to immediately transition from offset captures to exposed frame captures with minimum latency (do not require throw-away frames during this transition).

3) Flexible x-ray exposed frame count that allows a continuous series of images to be captured, corrected and delivered by the detector to the host computer for a non-prescribed duration. Further it may be desirable to have the ability to "pause" in fluoroscopy applications such that exposed image captures can be interrupted and resumed without needing to return to the offset image capture state. Relative to hardware limitations that restrict the choice of solutions, the detector module may have limited input/output lines to flag the type/disposition of the images being captured.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
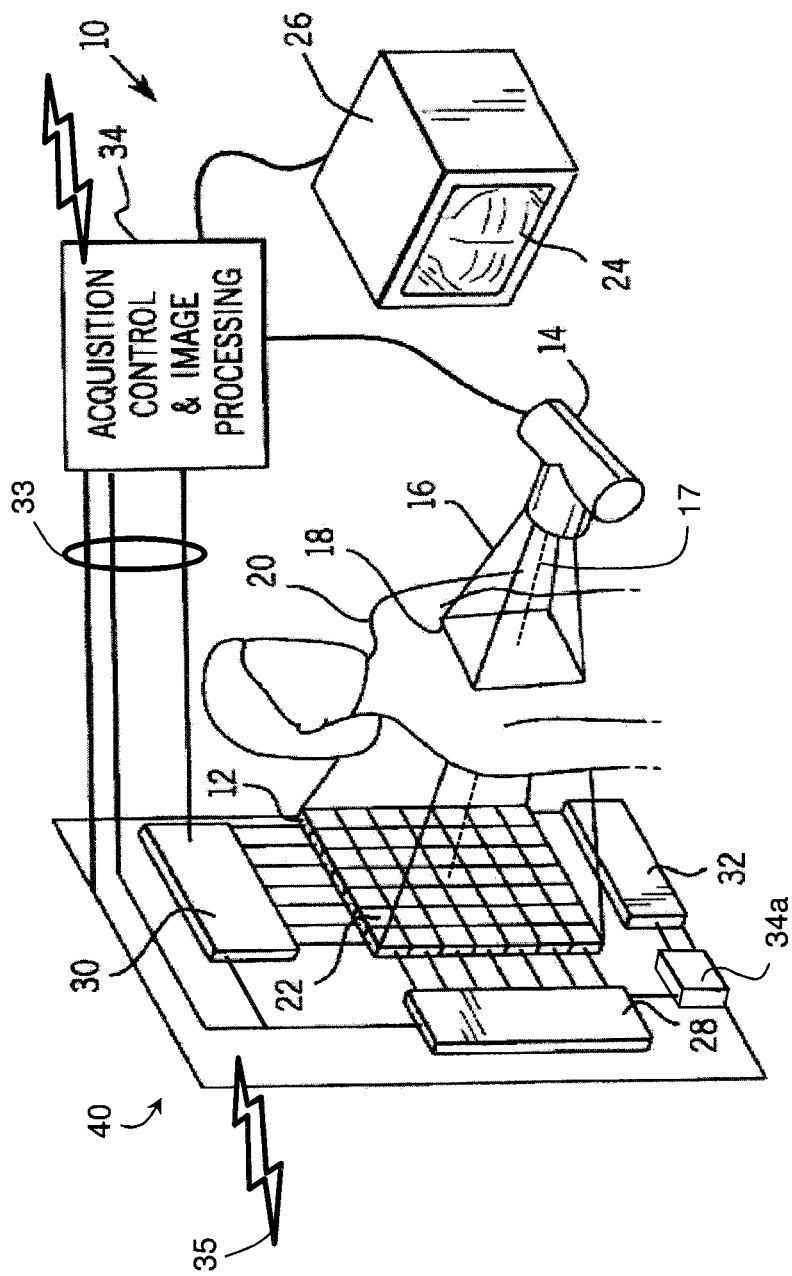
FIG. 1 is a diagram of an exemplary digital radiographic imaging system.

FIG. 1 is a perspective view of a digital radiographic (DR) imaging system 10 that may include a generally curved or planar DR detector 40 (shown in a planar embodiment and without a housing for clarity of description), an x-ray source 14 configured to generate radiographic energy (x-ray radiation), and a digital monitor, or electronic display, 26 configured to display images captured by the DR detector 40, according to one embodiment. The DR detector 40 may include a two dimensional array 12 of detector cells 22 (photosensors), arranged in electronically addressable rows and columns. The DR detector 40 may be positioned to receive x-rays 16 passing through a subject 20 during a radiographic energy exposure, or radiographic energy pulse, emitted by the x-ray source 14. As shown in FIG. 1, the radiographic imaging system 10 may use an x-ray source 14 that emits collimated x-rays 16, e.g. an x-ray beam, selectively aimed at and passing through a preselected region 18 of the subject 20. The x-ray beam 16 may be attenuated by varying degrees along its plurality of rays according to the internal structure of the subject 20, which attenuated rays are detected by the array 12 of photosensitive detector cells 22. The curved or planar DR detector 40 is positioned, as much as possible, in a perpendicular relation to a substantially central ray 17 of the plurality of rays 16 emitted by the x-ray source 14. In a curved array embodiment, the source 14 may be centrally positioned such that a larger percentage, or all, of the photosensitive detector cells are positioned perpendicular to incoming x-rays from the centrally positioned source 14. The array 12 of individual photosensitive cells (pixels) 22 may be electronically addressed (scanned) by their position according to column and row. As used herein, the terms "column" and "row" refer to the vertical and horizontal arrangement of the photosensor cells 22 and, for clarity of description, it will be assumed that the rows extend horizontally and the columns extend vertically. However, the orientation of the columns and rows is arbitrary and does not limit the scope of any embodiments disclosed herein. Furthermore, the term "subject" may be illustrated as a human patient in the description of FIG. 1, however, a subject of a DR imaging system, as the term is used herein, may be a human, an animal, an inanimate object, or a portion thereof.

In one exemplary embodiment, the rows of photosensitive cells 22 may be scanned one or more at a time by electronic scanning circuit 28 so that the exposure data from the array 12 may be transmitted to electronic read-out circuit 30. Each photosensitive cell 22 may independently store a charge proportional to an intensity, or energy level, of the attenuated radiographic radiation, or x-rays, received and absorbed in the cell. Thus, each photosensitive cell, when read-out, provides information defining a pixel of a radiographic image 24, e.g. a brightness level or an amount of energy absorbed by the pixel, that may be digitally decoded by image processing electronics 34 and transmitted to be displayed by the digital monitor 26 for viewing by a user. An electronic bias circuit 32 is electrically connected to the two-dimensional detector array 12 to provide a bias voltage to each of the photosensitive cells 22.

Each of the bias circuit 32, the scanning circuit 28, and the read-out circuit 30, may communicate with an acquisition control and image processing unit 34 over a connected cable 33 (wired), or the DR detector 40 and the acquisition control and image processing unit 34 may be equipped with a wireless transmitter and receiver to transmit radiographic image data wirelessly 35 to the acquisition control and image processing unit 34. The acquisition control and image processing unit 34 may include a processor and electronic memory (not shown) to control operations of the DR detector 40 as described herein, including control of circuits 28, 30, and 32, for example, by use of programmed instructions, and to store and process image data. The acquisition control and image processing unit 34 may also be used to control activation of the x-ray source 14 during a radiographic exposure, controlling an x-ray tube electric current magnitude, and thus the fluence of x-rays in x-ray beam 16, and/or the x-ray tube voltage, and thus the energy level, or dose, of the x-rays in x-ray beam 16.

A portion or all of the acquisition control and image processing unit 34 functions may reside in the detector 40 in an on-board processing system 34a which may include a processor and electronic memory to control operations of the DR detector 40 as described herein, including control of circuits 28, 30, and 32, by use of programmed instructions, and to store and process image data similar to the functions of standalone acquisition control and image processing system 34. The image processing system 34a may perform some or all the image acquisition and image disposition functions as described herein. The image processing system 34a may control image transmission and image processing and image correction on board the detector 40 based on instructions or other commands transmitted from the acquisition control and image processing unit 34a, and transmit corrected digital image data therefrom. Alternatively, acquisition control and image processing unit 34 may receive raw image data from the detector 40 and process the image data and store it, or it may store raw unprocessed image data in local memory, or in remotely accessible memory.

With regard to a direct detection embodiment of DR detector 40, the photosensitive cells 22 may each include a sensing element sensitive to x-rays, i.e. it absorbs x-rays and generates an amount of charge carriers in proportion to a magnitude of the absorbed x-ray energy. A switching element may be configured to be selectively activated to read out the charge level of a corresponding x-ray sensing element. With regard to an indirect detection embodiment of DR detector 40, photosensitive cells 22 may each include a sensing element sensitive to light rays in the visible spectrum, i.e. it absorbs light rays and generates an amount of charge carriers in proportion to a magnitude of the absorbed light energy, and a switching element that is selectively activated to read the charge level of the corresponding sensing element. A scintillator, or wavelength converter, may be disposed over the light sensitive sensing elements to convert incident x-ray radiographic energy to visible light energy. Thus, in the embodiments disclosed herein, it should be noted that the DR detector 40 (or DR detector 300 in FIG. 3 or DR detector 400 in FIG. 4) may include an indirect or direct type of DR detector.

Examples of sensing elements used in sensing array 12 include various types of photoelectric conversion devices (e.g., photosensors) such as photodiodes (P-N or PIN diodes), photo-capacitors (MIS), photo-transistors or photoconductors. Examples of switching elements used for signal read-out include a-Si TFTs, oxide TFTs, MOS transistors, bipolar transistors and other p-n junction components.

Figure 2:
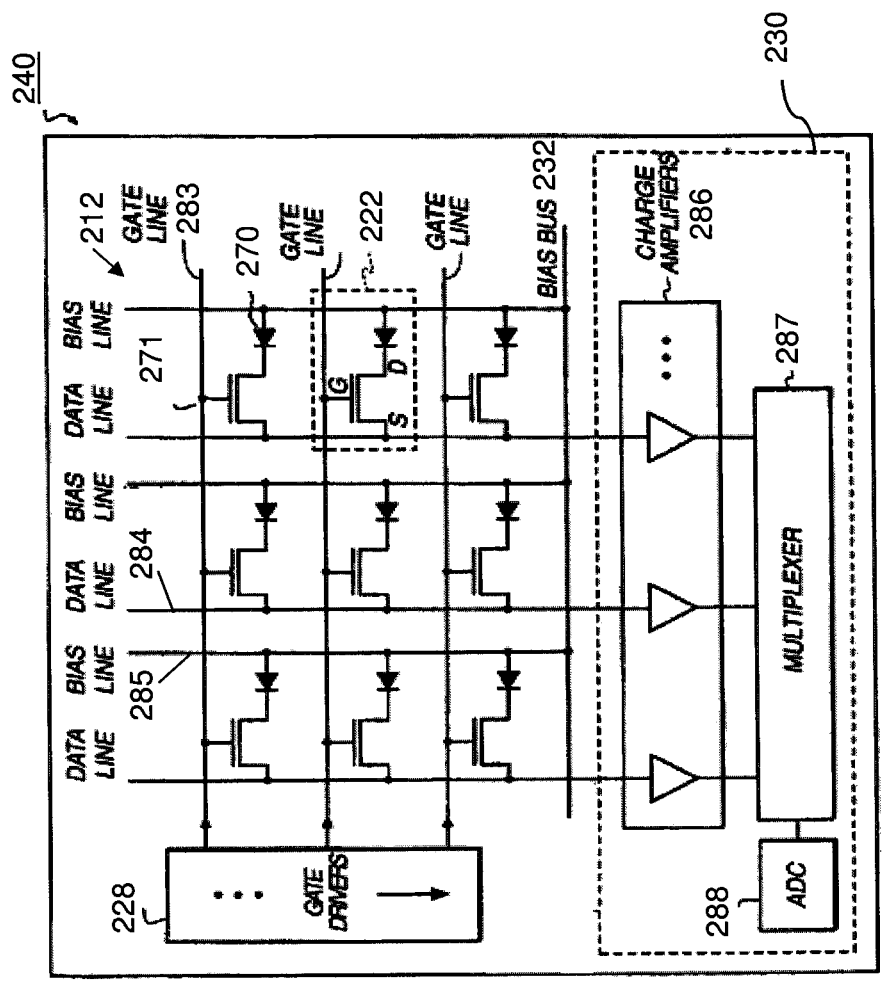
FIG. 2 is a schematic diagram of an imaging array for an exemplary digital radiographic (DR) detector.

FIG. 2 is a schematic diagram 240 of a portion of a two-dimensional array 12 for a DR detector 40. The array of photosensor cells 212, whose operation may be consistent with the photosensor array 12 described above, may include a number of hydrogenated amorphous silicon (a-Si:H) n-i-p photodiodes 270 and thin film transistors (TFTs) 271 formed as field effect transistors (FETs) each having gate (G), source (S), and drain (D) terminals. In embodiments of DR detector 40 disclosed herein, such as a multilayer DR detector (400 of FIG. 4), the two-dimensional array of photosensor cells 12 may be formed in a device layer that abuts adjacent layers of the DR detector structure, which adjacent layers may include a rigid glass layer or a flexible polyimide layer without any adjacent rigid layers. A plurality of gate driver circuits 228 may be electrically connected to a plurality of gate lines 283 which control a voltage applied to the gates of TFTs 271, a plurality of readout circuits 230 may be electrically connected to data lines 284, and a plurality of bias lines 285 may be electrically connected to a bias line bus or a variable bias reference voltage line 232 which controls a voltage applied to the photodiodes 270. Charge amplifiers 286 may be electrically connected to the data lines 284 to receive signals therefrom. Outputs from the charge amplifiers 286 may be electrically connected to a multiplexer 287, such as an analog multiplexer, then to an analog-to-digital converter (ADC) 288, or they may be directly connected to the ADC, to stream out the digital radiographic image data at desired rates. In one embodiment, the schematic diagram of FIG. 2 may represent a portion of a DR detector 40 such as an a-Si:H based indirect flat panel, curved panel, or flexible panel imager.

Incident x-rays, or x-ray photons, 16 are converted to optical photons, or light rays, by a scintillator, which light rays are subsequently converted to electron-hole pairs, or charges, upon impacting the a-Si:H n-i-p photodiodes 270. In one embodiment, an exemplary detector cell 222, which may be equivalently referred to herein as a pixel, may include a photodiode 270 having its anode electrically connected to a bias line 285 and its cathode electrically connected to the drain (D) of TFT 271. The bias reference voltage line 232 can control a bias voltage of the photodiodes 270 at each of the detector cells 222. The charge capacity of each of the photodiodes 270 is a function of its bias voltage and its capacitance. In general, a reverse bias voltage, e.g. a negative voltage, may be applied to the bias lines 285 to create an electric field (and hence a depletion region) across the pn junction of each of the photodiodes 270 to enhance its collection efficiency for the charges generated by incident light rays. The image signal represented by the array of photosensor cells 212 may be integrated by the photodiodes while their associated TFTs 271 are held in a non-conducting (off) state, for example, by maintaining the gate lines 283 at a negative voltage via the gate driver circuits 228. The photosensor cell array 212 may be read out by sequentially switching rows of the TFTs 271 to a conducting (on) state by means of the gate driver circuits 228. When a row of the pixels 22 is switched to a conducting state, for example by applying a positive voltage to the corresponding gate line 283, collected charge from the photodiode in those pixels may be transferred along data lines 284 and integrated by the external charge amplifier circuits 286. The row may then be switched back to a non-conducting state, and the process is repeated for each row until the entire array of photosensor cells 212 has been read out. The integrated signal outputs are transferred from the external charge amplifiers 286 to an analog-to-digital converter (ADC) 288 using a parallel-to-serial converter, such as multiplexer 287, which together comprise read-out circuit 230.

This digital image information may be subsequently processed by image processing system 34 to yield a digital image which may then be digitally stored and immediately displayed on monitor 26, or it may be displayed at a later time by accessing the digital electronic memory containing the stored image. The flat panel DR detector 40 having an imaging array as described with reference to FIG. 2 is capable of both single-shot (e.g., static, radiographic) and continuous (e.g., fluoroscopic) image acquisition.

Figure 3:
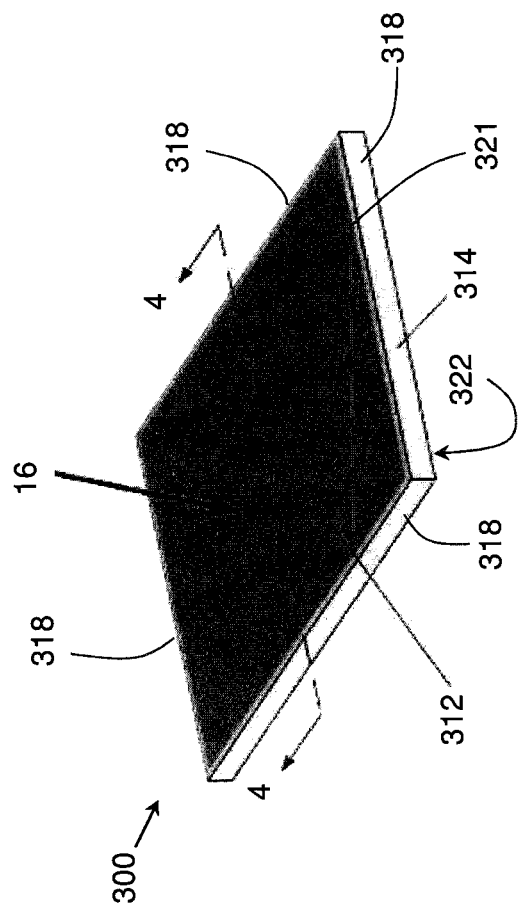
FIG. 3 shows a perspective view of an exemplary portable wireless DR detector.

FIG. 3 shows a perspective view of an exemplary prior art generally rectangular, planar, portable wireless DR detector 300 according to an embodiment of DR detector 40 disclosed herein. The DR detector 300 may include a flexible substrate to allow the DR detector to capture radiographic images in a curved orientation. The flexible substrate may be fabricated in a permanent curved orientation, or it may remain flexible throughout its life to provide an adjustable curvature in two or three dimensions, as desired. The DR detector 300 may include a similarly flexible housing portion 314 that surrounds a multilayer structure comprising a flexible photosensor array portion 22 of the DR detector 300. The housing portion 314 of the DR detector 300 may include a continuous, rigid or flexible, x-ray opaque material or, as used synonymously herein a radio-opaque material, surrounding an interior volume of the DR detector 300. The housing portion 314 may include four flexible edges 318, extending between the top side 321 and the bottom side 322, and arranged substantially orthogonally in relation to the top and bottom sides 321, 322. The bottom side 322 may be continuous with the four edges and disposed opposite the top side 321 of the DR detector 300. The top side 321 comprises a top cover 312 attached to the housing portion 314 which, together with the housing portion 314, substantially encloses the multilayer structure in the interior volume of the DR detector 300. The top cover 312 may be attached to the housing 314 to form a seal therebetween, and be made of a material that passes x-rays 16 without significant attenuation thereof, i.e., an x-ray transmissive material or, as used synonymously herein, a radiolucent material, such as a carbon fiber plastic, polymeric, or other plastic based material.

Figure 4:
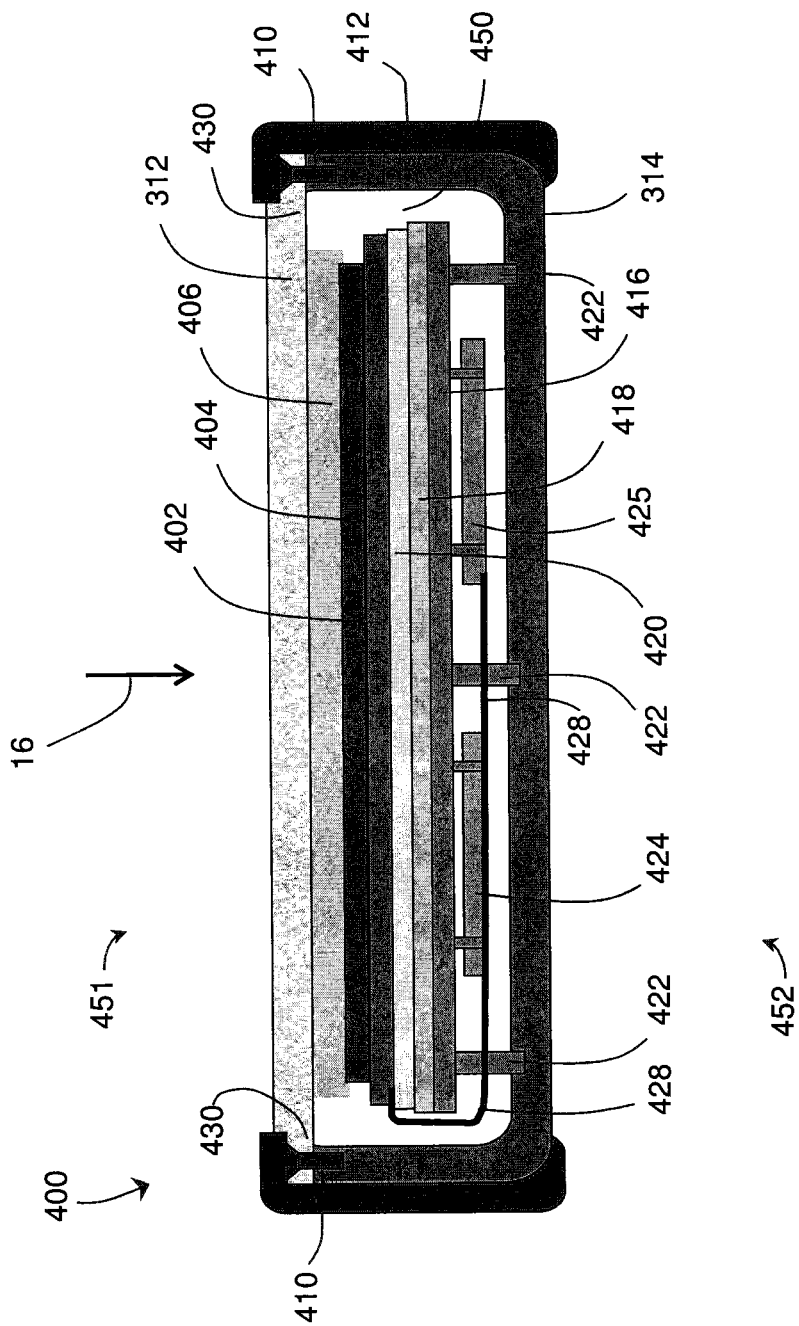
FIG. 4 shows a cross section view of the exemplary portable wireless DR detector of FIG. 3.

With reference to FIG. 4, there is illustrated in schematic form an exemplary cross-section view along section 4-4 of the exemplary embodiment of the DR detector 300 (FIG. 3). For spatial reference purposes, one major surface of the DR detector 400 may be referred to as the top side 451 and a second major surface may be referred to as the bottom side 452, as used herein. The multilayer structure may be disposed within the interior volume 450 enclosed by the housing 314 and top cover 312 and may include a flexible curved or planar scintillator layer 404 over a curved or planar the two-dimensional imaging sensor array 12 shown schematically as the device layer 402. The scintillator layer 404 may be directly under (e.g., directly connected to) the substantially planar top cover 312, and the imaging array 402 may be directly under the scintillator 404. Alternatively, a flexible layer 406 may be positioned between the scintillator layer 404 and the top cover 312 as part of the multilayer structure to allow adjustable curvature of the multilayer structure and/or to provide shock absorption. The flexible layer 406 may be selected to provide an amount of flexible support for both the top cover 312 and the scintillator 404, and may comprise a foam rubber type of material. The layers just described comprising the multilayer structure each may generally be formed in a rectangular shape and defined by edges arranged orthogonally and disposed in parallel with an interior side of the edges 318 of the housing 314, as described in reference to FIG. 3.

A substrate layer 420 may be disposed under the imaging array 402, such as a rigid glass layer, in one embodiment, or flexible substrate such as polyimide upon which the array of photosensors 402 may be formed to allow adjustable curvature of the array, and may comprise another layer of the multilayer structure. Under the substrate layer 420 a radio-opaque shield layer 418 may be used as an x-ray blocking layer to help prevent scattering of x-rays passing through the substrate layer 420 as well as to block x-rays reflected from other surfaces in the interior volume 450. Readout electronics, including the scanning circuit 28, the read-out circuit 30, the bias circuit 32, and processing system 34a (all of FIG. 1) may be formed adjacent the imaging array 402 or, as shown, may be disposed below frame support member 416 in the form of integrated circuits (ICs) electrically connected to printed circuit boards 424, 425. The imaging array 402 may be electrically connected to the readout electronics 424 (ICs) over a flexible connector 428 which may comprise a plurality of flexible, sealed conductors known as chip-on-film (COF) connectors. X-ray flux may pass through the radiolucent top panel cover 312, in the direction represented by an exemplary x-ray beam 16, and impinge upon scintillator 404 where stimulation by the high-energy x-rays 16, or photons, causes the scintillator 404 to emit lower energy photons as visible light rays which are then received in the photosensors of imaging array 402. The frame support member 416 may connect the multilayer structure to the housing 314 and may further operate as a shock absorber by disposing elastic pads (not shown) between the frame support beams 422 and the housing 314. Fasteners 410 may be used to attach the top cover 312 to the housing 314 and create a seal therebetween in the region 430 where they come into contact. In one embodiment, an external bumper 412 may be attached along the edges 318 of the DR detector 400 to provide additional shock-absorption.

Figure 5:
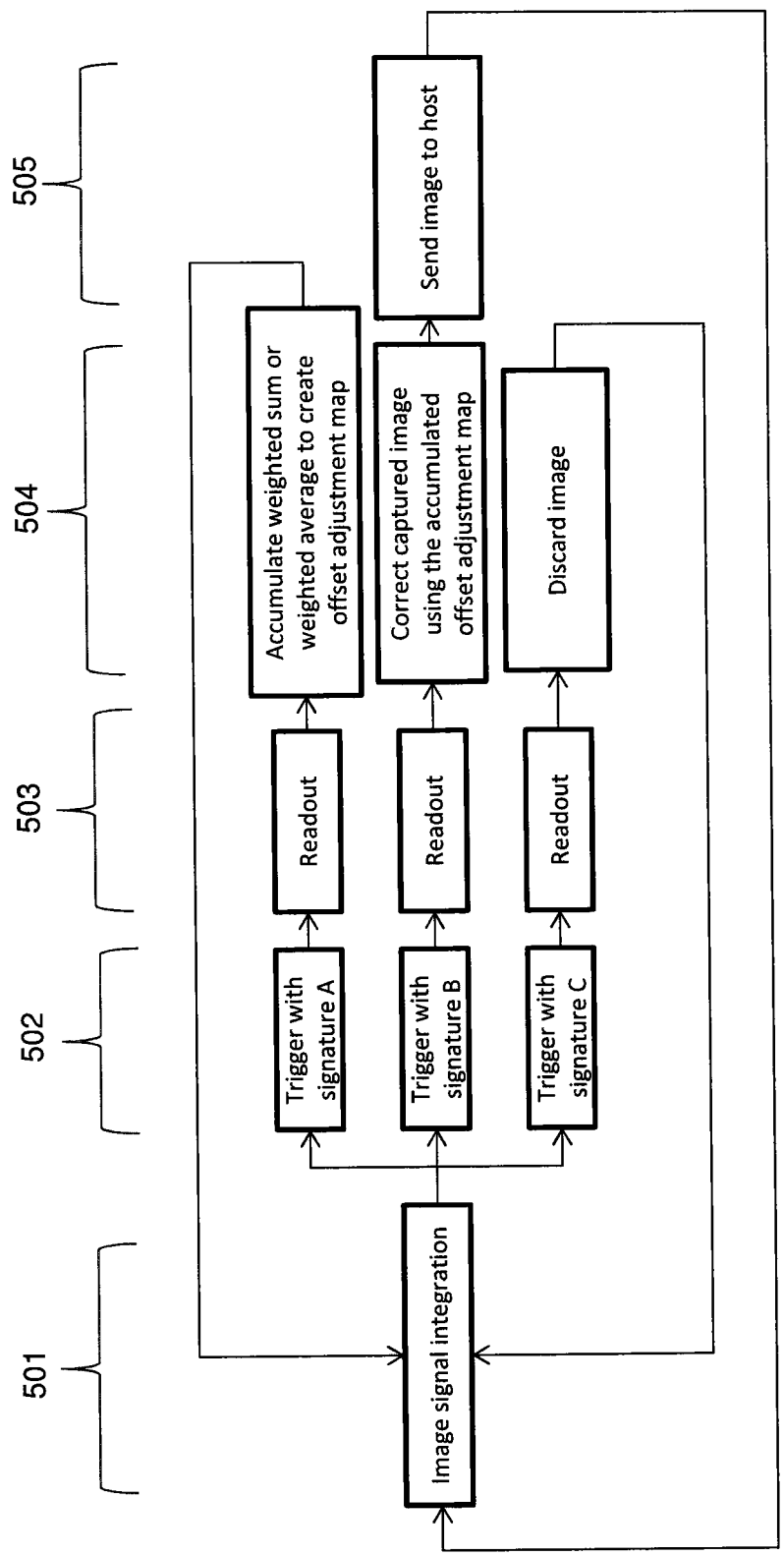
FIG. 5 is a flow diagram of an exemplary method for practicing embodiments disclosed herein.

FIG. 5 illustrates a flow chart of an exemplary method for practicing the invention disclosed herein. The illustrated steps are not necessarily indicative of a relative time sequence, as the various steps may be performed simultaneously or interchanged. At step 501, image signal data is captured in the detector during an integration period. This step is typically triggered by a synchronization signal which may be transmitted at regular intervals to the DR detector by a host system such as the acquisition control and image processing unit 34 which controls synchronization of x-ray source 14 activation and image capture (integration) in the DR detector 40, followed by captured image data read out using circuits 28, 30, 32, 34a, as described herein. The synchronization signal is transmitted over a sync line which may be embodied as a hardware conductor in the connected cable 33 or a wireless 35 transmission channel. Although step 501 is labeled image signal integration, the x-ray source 14 may not necessarily be activated such that the image signal integration 501 results in a radiographic image capture in the DR detector 40. If the x-ray source 14 is not emitting x-rays (not activated), then the DR detector 40 will capture a dark image frame in response to the synchronization signal, which dark image frame may be used in generating an offset adjustment map as described herein. At step 502, the DR detector determines a disposition mode signal embedded in the synchronization signal by the host system which, in one embodiment, includes determining a variable signature or other unique characteristic embedded in the synchronization signal that indicates one of a plurality of disposition modes.

The determined mode may include an instruction for the DR detector 40 control electronics 28, 30, 32, 34a, to either perform A) capturing and storing a dark frame to be used as an offset adjustment correction map, which may include summing a captured dark frame with previously captured dark frames or combining them using another method such as a weighted sum average; B) image correction processing on the captured image frame, such as using the stored accumulated offset adjustment map, and transmitting the corrected image to the host system 34; or C) discard the captured image frame. At step 503, the image frame data is read out from the detector and the determined image disposition step is performed at step 504, and step 505 if disposition B is determined.

Figure 6:
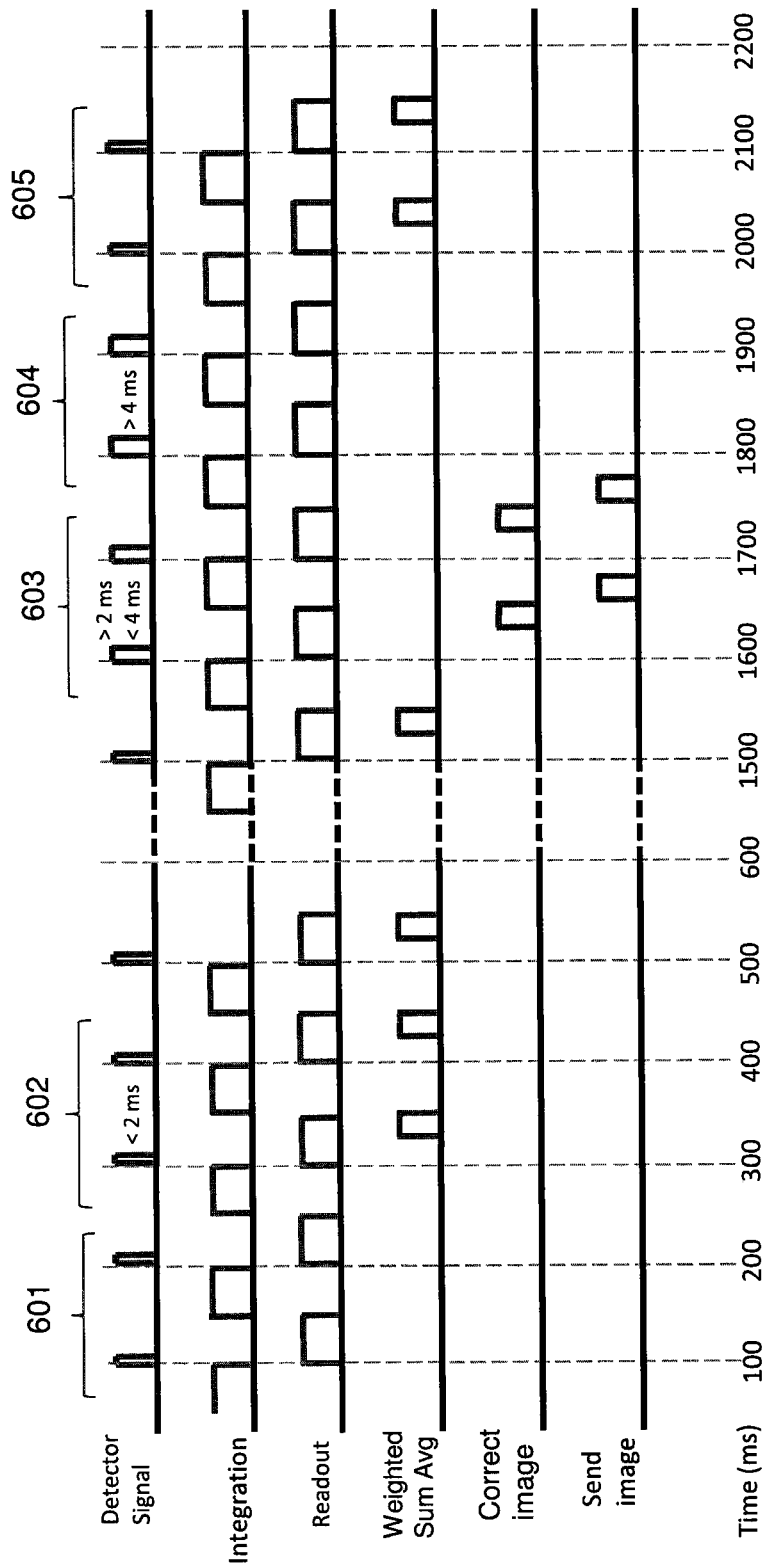
FIG. 6 is an exemplary signal timing diagram for implementing embodiments described herein.

In one embodiment, the DR detector may be programmed to sample the synchronization line and determine a pulse width of the synchronization signal (Detector Signal, FIG. 6). The pulse width may be selected by the host system to indicate the preselected disposition mode to the DR detector. In one embodiment, shown in Table 1 below, a pulse width less than 2 ms identifies the A type synchronization signal which indicates to the DR detector that the image captured immediately beforehand is to be dispositioned as a dark image for generating the offset adjustment map. A pulse width between 2 ms and 4 ms identifies the B type synchronization signal which indicates to the DR detector that the image captured immediately beforehand is to be corrected using the accumulated offset adjustment map and transmitted back to the host system. A pulse width greater than 4 ms identifies the C type synchronization signal which indicates to the DR detector that the image captured immediately beforehand is to be discarded.

In one embodiment, the DR detector may be programmed to sample the sync line every 2 ms starting at a detected rising edge of the synchronization signal. If, at 2 ms, the synchronization signal is detected to be low, a digital zero (0), the DR detector detects that the synchronization signal is indicating an A type disposition procedure to be carried out on the just captured image data frame, while if the synchronization signal is detected to be high, a digital one (1), no determination is made. If, at 4 ms, the synchronization signal is detected to be a digital zero (0) and no determination was made at 2 ms, the DR detector detects that the synchronization signal is indicating a B type disposition procedure to be carried out on the just captured image data frame, while if the synchronization signal is detected to be a digital one (1) at 4 ms, the DR detector detects that the synchronization signal is indicating a C type disposition procedure to be carried out on the just captured image data frame. One skilled in the art may easily recognize that the sampling performed by the DR detector may repeated for longer than 4 ms to determine further image disposition actions selected by the host system and that the sample period may be selected to be greater or less than 2 ms with a corresponding effective decrease or increase in the number of different image disposition procedures that may be communicated to the DR detector under control of the host system. In such an embodiment, the time intervals of Table 1 may be expanded to include several pulse durations with an increase in corresponding detector actions to be performed.

Figure 7:
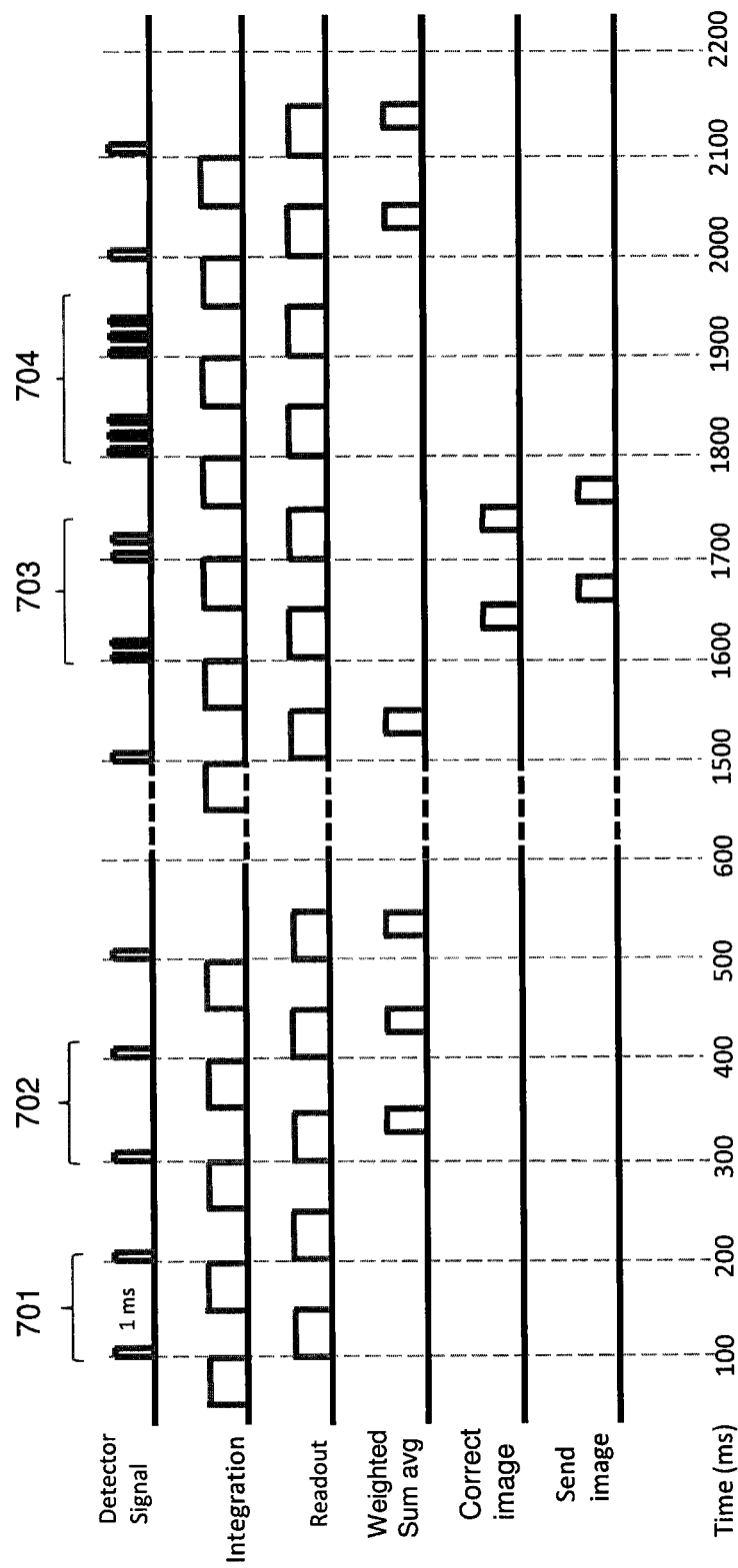
FIG. 7 is an exemplary signal timing diagram for implementing embodiments described herein

In one embodiment, the synchronization signal may be sampled multiple times by the DR detector during a sample window, as described above, but the detector may be programmed to count or decode a number of digital ones (1) in the synchronization signal rather than determining a pulse width of the synchronization signal (Detector Signal, FIG. 7). In one embodiment, DR detector may be programmed to sample the sync line every 1 ms starting at a detected rising edge of the synchronization signal. The DR detector may sample the sync line several times during a predetermined sampling window interval and count the number of digital ones (1) that were transmitted by the host system. Different counts may correspond to different image disposition procedures to be carried out by the detector, as described herein. The different procedures that may be identified in the synchronization signal may include the A, B, C, procedures described herein, and may further include adjusting a gain magnitude to be performed by the DR detector during image read out, or a pixel binning size to be used by the DR detector during image read out, which are known parameters used in DR detector image processing.

FIGS. 6 and 7 illustrate exemplary signal timing diagrams for implementing embodiments described herein. It should be noted that the waveforms depicted in FIGS. 6 and 7 are not drawn to scale for ease of description. FIGS. 6 and 7 illustrate exemplary synchronization signals described herein and labeled as Detector Signal which are transmitted regularly at 100 ms intervals. The rising edge of the synchronization signals are used by the DR detector to terminate image capture (or image integration), shown as the falling edge of the signal labeled as Integration, and begin image read out, shown as the rising edge of the signal labeled as Readout. As described herein, the synchronization signal may be transmitted over a sync line for at least two purposes: synchronizing the detector such as by indicating to the detector a transition between image capture/read out, as shown for example in the 100-200 ms period 601, 701, and an image disposition procedure to be performed by the detector. In one embodiment, the sync line is a monodirectional host-to-detector communication medium. The sequence of image frame captures is continuously performed in one embodiment of a DR detector as shown by the Integration and Readout sequences in the waveforms of FIGS. 6 and 7, responsive to the 100 ms synchronization signals.

As described herein, the rising edge of the synchronization signal at 300 ms under period 602 terminates integration of an image frame and begins its read out, as shown by the falling edge of the Integration signal and rising edge of the Readout signal, respectively, at the 300 ms mark. The detector determines the pulse width of the synchronization signal to be less than 2 ms indicating to the detector an A type image disposition and that the image just captured at the 300 ms mark is a dark image to be combined with previous dark images, if any, and stored as an offset image correction map to be used for captured image correction, which storage as an offset image is shown by the rising/falling edges of the Weighted Sum Avg signal after the 300 ms mark. As shown in FIG. 6, the storage of the offset image begins after read out begins but before read out is completed. As described herein, the rising edge of the synchronization signal at 1600 ms under period 603 terminates integration of an image frame and begins its read out, as shown by the falling edge of the Integration signal and rising edge of the Readout signal, respectively, at the 1600 ms mark. The detector determines the pulse width of the synchronization signal to be greater than 2 ms and less than 4 ms indicating to the detector a B type image disposition and that the image just captured at the 1600 ms mark is a radiographic captured image to be processed on board the detector using the stored offset correction map and then transmitted to the host system, which correction processing is shown by the rising/falling edges of the Correct Image signal after the 1600 ms mark. Transmission of the corrected image to the host system is shown by the rising/falling edges of the Send Image signal after the 1600 ms mark. As shown in FIG. 6, on board image correction processing begins after read out begins but before read out is completed. The corrected image is transmitted after correction is completed. As described herein, the rising edge of the synchronization signal at 1800 ms under period 604 terminates integration of an image frame and begins its read out, as shown by the falling edge of the Integration signal and rising edge of the Readout signal, respectively, at the 1800 ms mark. The detector determines the pulse width of the synchronization signal to be greater 4 ms indicating to the detector a C type image disposition and that the image just captured at the 1800 ms mark is to be discarded. In one embodiment, although not explicitly shown in the Readout waveforms of FIGS. 6 and 7, the read out begins at a preset default period, e.g., 5 ms, after the rising edge of the synchronization signal. In one embodiment, pulse width determinations and pulse counts as described herein, may be determined during that default period, which default period may be designed to vary in length, as desired.

As described herein, each captured image may be dispositioned individually according to the determined characteristic embedded in the synchronization signal, which allows the imaging system great flexibility to control instantaneous image dispositioning. As shown in the region under 605, the imaging system may indicate to the detector to capture dark images until a next imaging sequence begins. A continuous image correction/send sequence may be used such as in a fluoroscopy mode. If the fluoroscopic imaging is paused, dark images may be captured to update the image correction map during the pause, and then fluoroscopic imaging may be resumed using the updated correction map. The signals transmitted to the detector may be initiated via exposure control buttons selected by an operator using the imaging system. In one embodiment, the selection of image dispositions may be preset and controlled by a schedule program.

TABLE 1

| Pulse Duration (msec) | Frame Type | Detector Action |
|---|---|---|
| Duration < 2.0 | Dark (Offset) | Accumulate weighted sum average of image set. |
| 2 ≤ Duration < 4 | Exposed | Correct and deliver image to host |
| Duration ≥ 4 | Throw Away | Readout and throw away image |

FIG. 7 illustrates an embodiment described hereinabove whereby a count of synchronization signal pulses is used to indicate to the DR detector a selection of an image dispositioning procedure. The embodiment is described in summary form hereinbelow, as the description generally follows the illustration of FIG. 6, already described above and so certain steps will not be repeated here. As described herein, the rising edge of the synchronization signal at 300 ms under period 702 is counted as one digital one (1) within a predetermined sampling window having a duration of some fraction of 100 ms, which is the period of the synchronization signal. After the sampling interval times out, the detector determines that the count of one indicates an A type image disposition and that the image just captured at the 300 ms mark is a dark image to be combined with previous dark images, if any, and stored as an offset image correction map to be used for captured image correction, which storage as an offset image is shown by the rising/falling edges of the Weighted Sum Avg signal after the 300 ms mark. As described herein, the rising edges of the synchronization signal at 1600 ms under period 703 is counted as two digital ones (1) within a predetermined sampling window having a duration of some fraction of 100 ms. After the sampling interval times out, the detector determines that the count of two indicates a B type image disposition and that the image just captured at the 1600 ms mark is a captured radiographic image to be corrected and transmitted to the host system. As described herein, the rising edges of the synchronization signal at 1800 ms under period 704 is counted as three digital ones (1) within a predetermined sampling window having a duration of some fraction of 100 ms. After the sampling interval times out, the detector determines that the count of three indicates a C type image disposition and that the image just captured at the 1800 ms mark is to be discarded.

In one embodiment, all images captured by the detector may be indicated to be stored in the detector to be retrievable from the detector after an imaging sequence is completed, or in the event of a transfer failure. The number of allowable frames to be captured may be limited by the detector memory and may be established before the exposures are initiated. This may support a tomosynthesis imaging mode.

In one embodiment, a streaming mode may be indicated in which corrected images may be continuously transferred out of the detector for as long as desired. This supports fluoroscopy applications and allows a pause/resume in image acquisitions utilizing an offset image set acquired prior to the first exposures, or some portion of the dark image frames being captured during the pause period.

In one embodiment, other signal characteristics may be used to transmit an indication to the detector of an image disposition mode to be used, such as a voltage level of the signal, or other logical bit information that may be transmitted. Disclosed herein is the use of synchronization pulse width to flag the disposition of an acquired image on a detector. On-detector offset correction uses a continuously updated weighted sum average of most recent frames. Image weightings are dependent on a required number of offset frames to be captured. Further, real time image capture and viewing is disclosed with on-detector corrections and supporting "capture-pause-resume capture" usage cases without delay between states. Initial offset correction maps for the pre and post pause images, or some portion of the dark image frames being captured during the pause period in combination with the initially captured offset correction map are used. The number or use of the dark frames captured during pause can be dependent on the pause period, e.g., during a very long pause period the initial frames can be discarded so as to not use the exposed image lag during corrections while the later frames can be used exclusively or in combination with the initial offset correction map. Finally, creation of offset image maps may be performed using the same window size as the exposed frames.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method implemented by a digital radiographic detector in a digital radiographic imaging system, the method comprising:
   receiving a first synchronization signal transmitted by a processor for controlling the digital radiographic imaging system, the first synchronization signal for controlling a transition between image integration performed by the detector and image readout performed by the detector;
   detecting a first mode signal in the first synchronization signal, wherein the first mode signal indicates a first disposition procedure comprising accumulating a captured image corresponding to the first synchronization signal;
   capturing a first image corresponding to the first synchronization signal;
   dispositioning the captured first image according to the first image disposition procedure;
   receiving a second synchronization signal transmitted by the processor;
   detecting a second mode signal in the second synchronization signal, wherein the second mode signal indicates a second disposition procedure comprising correcting and storing a captured image corresponding to the second synchronization signal;
   capturing a second image corresponding to the second synchronization signal; and
   dispositioning the captured second image according to the second image disposition procedure.

2. The method of claim 1, further comprising:
   correcting the captured second image according to the accumulated captured first image.

3. The method of claim 1, further comprising:
receiving a third synchronization signal transmitted by the processor;
detecting a third mode signal in the third synchronization signal, wherein the third mode signal indicates a third disposition procedure comprising discarding a captured image corresponding to the third synchronization signal;
capturing a third image corresponding to the third synchronization signal; and
dispositioning the captured third image according to the third image disposition procedure.

4. The method of claim 1, further comprising:
receiving at the detector a dark image; and
dispositioning the dark image according to the first disposition procedure, including storing the dark image as a correction image.

5. The method of claim 4, further comprising combining and storing as the correction image a plurality of received dark images.

6. The method of claim 5, further comprising combining and storing received dark images as the correction image only if the dark images have been received within a preset time window.

7. The method of claim 4, further comprising combining and storing as the correction image a plurality of received dark images as a weighted average of the received dark images, wherein a more recently received dark image is weighted higher than a less recently received dark image.

8. The method of claim 4, further comprising combining and storing as the correction image a plurality of recently received dark images as a weighted average of received dark images and subtracting therefrom the most aged received dark image to maintain the weighted average as based on a preset number of most recently received dark images.

9. The method of claim 4, further comprising storing an offset image map as the correction image.

10. The method of claim 1, wherein the first mode signal and the second mode signal each comprise a different detectable pulse width, a different detectable number and timing of rising edges, a different detectable digital code, a different detectable voltage level, or a combination thereof, for use by the detector to distinguish the first mode signal from the second mode signal.

11. The method of claim 1, further comprising:
receiving a third synchronization signal transmitted by the processor;
detecting a third mode signal in the third synchronization signal, wherein the third mode signal indicates a third disposition procedure for a captured image corresponding thereto, and wherein the third disposition procedure is selected from the group consisting of: selecting a binning procedure for reading out the captured image; and selecting a gain level for reading out the captured image.

12. A method of controlling a digital radiographic detector in a digital radiographic imaging system, the method comprising:
transmitting a synchronization signal from a processor of the digital radiographic imaging system to the digital radiographic detector, the synchronization signal for controlling a transition between an image capture state of the detector and an image readout state of the detector; and
selectively modifying a pulse width of the synchronization signal into one of at least two different pulse widths that is detectable by the detector, wherein a first one of the modified pulse widths is configured to cause the detector to accumulate a radiographic image captured in the detector that corresponds to the first modified pulse width, and wherein a second one of the modified pulse widths is configured to cause the detector to correct and store a radiographic image captured in the detector that corresponds to the second modified pulse width.

13. The method of claim 12, wherein the second one of the modified pulse widths is further configured to cause the detector to correct the captured radiographic image using the accumulated radiographic image captured in the detector.

14. The method of claim 12, further comprising transmitting the synchronization signal from the processor of the digital radiographic imaging system over only one conductor.

15. A method implemented by a digital radiographic detector in a digital radiographic imaging system, the method comprising:
receiving a first signal transmitted by a processor in the digital radiographic imaging system, the first signal for transitioning the detector from an integration phase to an image readout phase;
detecting a first characteristic of the first signal transmitted by the processor, wherein the detected first characteristic instructs the detector to accumulate a captured radiographic image corresponding to the first signal;
reading out a first digital image captured in the digital radiographic detector corresponding to the first signal and accumulating the read out first image;
receiving a second signal transmitted by the processor in the digital radiographic imaging system, the second signal for transitioning the detector from an integration phase to an image readout phase;
detecting a second characteristic of the second signal transmitted by the processor, wherein the detected second characteristic instructs the detector to correct and store a captured radiographic image corresponding to the second signal; and
reading out a second digital image captured in the digital radiographic detector corresponding to the second signal and correcting and storing the read out second image.

16. The method of claim 15, wherein the step of detecting the first characteristic and the step of detecting the second characteristic each comprises detecting a different pulse width of the first and second signals transmitted by the processor or detecting a different number of pulses within a preset time window in the first and second signals transmitted by the processor.

17. The method of claim 15, further comprising:
receiving a third signal transmitted by the processor in the digital radiographic imaging system, the third signal for transitioning the detector from an integration phase to an image readout phase;
detecting a third characteristic of the third signal transmitted by the processor, wherein the detected third characteristic comprises one of a plurality of detectable characteristics each corresponding to one of a plurality of image disposition procedures; and
reading out a third digital image captured in the digital radiographic detector corresponding to the third signal and dispositioning the read out third image according to the corresponding one of the plurality of image disposition procedures.

18. The method of claim 12, wherein a third one of the modified pulse widths is configured to cause the detector to discard a radiographic image captured in the detector that corresponds to the third modified pulse width.

19. The method of claim 12, further comprising repeatedly transmitting the synchronization signal from the processor of the digital radiographic imaging system to the digital radiographic detector having the first one of the modified pulse widths for causing the detector to accumulate a plurality of dark images captured in the detector.

20. The method of claim 15, further comprising correcting the read out second image using the accumulated read out first image.

* * * * *